United States Patent
Koli et al.

(10) Patent No.: US 9,819,267 B2
(45) Date of Patent: Nov. 14, 2017

(54) SWITCHED MODE POWER SUPPLY

(71) Applicant: Telefonaktiebolaget LM Ericsson (publ), Stockholm (SE)

(72) Inventors: Kimmo Koli, Turku (FI); Janne Peltonen, Salo (FI); Sami Vilhonen, Lieto (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/916,155

(22) PCT Filed: Sep. 3, 2014

(86) PCT No.: PCT/EP2014/068683
§ 371 (c)(1),
(2) Date: Mar. 2, 2016

(87) PCT Pub. No.: WO2015/032793
PCT Pub. Date: Mar. 12, 2015

(65) Prior Publication Data
US 2016/0197553 A1    Jul. 7, 2016

(30) Foreign Application Priority Data

Sep. 4, 2013 (EP) .................................... 13183040

(51) Int. Cl.
*H02M 3/15* (2006.01)
*H02M 3/158* (2006.01)
(Continued)

(52) U.S. Cl.
CPC ............. *H02M 3/158* (2013.01); *H02M 1/38* (2013.01); *H02M 3/15* (2013.01); *H02M 3/1588* (2013.01);
(Continued)

(58) Field of Classification Search
CPC ............................................ H02M 2001/0006
See application file for complete search history.

(56) References Cited

U.S. PATENT DOCUMENTS 8,836,300 B2 *   9/2014  Sohma ................ H02M 3/1588
                                                     323/272
2008/0018311 A1 *  1/2008  Sakai .................... H02M 3/155
                                                     323/271
(Continued)

FOREIGN PATENT DOCUMENTS

JP          2008042917 A       2/2008
JP          2009044814 A       2/2009

*Primary Examiner* — Timothy J Dole
*Assistant Examiner* — Ishrat Jamali
(74) *Attorney, Agent, or Firm* — Murphy, Bilak & Homiller, PLLC

(57) ABSTRACT

A switched mode power supply (100) comprises a reactive element (10) and a control signal generator (30) is arranged to generate a first control signal at a first output (31) of the control signal generator (30) and a second control signal at a second output (32) of the control signal generator (30). The first output (31) of the control signal generator (30) is coupled to a first input (21) of a switching stage (20) by means of a first control signal path (40) and the second output (32) of the control signal generator (30) is coupled to a second input (22) of the switching stage (20) by means of a second control signal path (50). The switching stage (20) is arranged to, responsive to the first and second control signals, alternately charge and discharge the reactive element (10) by coupling it alternately to first and second supply voltages. A delay detector (60) is arranged to generate a delay indicator signal indicative of a relative delay between the first control signal at the first input (21) of the switching stage (20) and the second control signal at the second input (22) of the switching stage (20). An adjustable delay stage (53) in one of the first and second signal paths (40, 50) is arranged to, responsive to the delay indicator signal, control an adjustable delay so that a first delay (Continued)

experienced by the first control signal passing from the first output (31) of the control signal generator (30) to the first input (21) of the switching stage (20) is substantially equal to a second delay experienced by the second control signal passing from the second output (32) of the control signal generator (30) to the second input (22) of the switching stage (20).

11 Claims, 10 Drawing Sheets

(51) Int. Cl.
*H02M 1/38* (2007.01)
*H02M 1/00* (2006.01)

(52) U.S. Cl.
CPC .. *H02M 2001/0006* (2013.01); *Y02B 70/1466* (2013.01)

(56) References Cited

U.S. PATENT DOCUMENTS

| | | |
|---|---|---|
| 2008/0224677 A1 | 9/2008 | Kim et al. |
| 2012/0105045 A1 | 5/2012 | Burns et al. |
| 2012/0256665 A1* | 10/2012 | Teng .................... H03L 7/08 327/156 |
| 2012/0319754 A1 | 12/2012 | Lee et al. |
| 2014/0062431 A1* | 3/2014 | Yanase .................... G05F 1/46 323/271 |
| 2014/0183975 A1* | 7/2014 | Wu .................... H03K 17/063 307/130 |

* cited by examiner

SWITCHED MODE POWER SUPPLY

FIELD OF THE DISCLOSURE

The present disclosure relates to a switched mode power supply, an envelope tracking amplifier comprising a switched mode power supply, wireless communication device comprising an envelope tracking amplifier, and a method of operating a switched mode power supply.

BACKGROUND TO THE DISCLOSURE

The use of linear modulation is becoming increasingly important for wireless communication systems that are required to operate at a high data transmission speed. A wireless transmitter for use with linear modulation can employ envelope tracking to enable a power amplifier to attain high power efficiency. Envelope tracking sets a special challenge for a power supply that provides an operating voltage for such a power amplifier, because the operating voltage is not constant, but instead varies according to the envelope of a modulated signal being amplified. In order to attain high efficiency of such a wireless transmitter, the power supply must have high power efficiency. The power supply must provide a spurious-free voltage for the power amplifier. Additionally, the power supply must be able to follow a wideband control signal, corresponding to the envelope of the modulated signal being amplified, with high accuracy. This means that linearity of the power supply must be very good.

Conventional switched mode power supplies are operated at a relatively low switching frequency in order to achieve good power efficiency. However, this is not generally possible for a power supply for use with envelope tracking as the required modulation bandwidth is high. For example, the Third Generation Partnership Project (3GPP) Long Term Evolution standard using a 10 MHz bandwidth (LTE10) requires more than 10 MHz bandwidth for the wideband control signal. In general, the switching frequency of a switched mode power supply needs to be at least five times the bandwidth of the wideband control signal.

A typical switched mode power supply is based on the use of an inductor that is switched alternately to a supply voltage, such as a battery voltage, and to ground. The duty cycle of the switching determines the output voltage. The switching employs two switches that must not both be open at same time. If these two switches were to be open at same time, there would be a short circuit between the supply voltage and ground, which may damage the switched mode power supply, and in particular the two switches. To ensure that the two switches are not both open at the same time, a gap, also referred to as a dead time, is provided between switching the inductor from the supply voltage to ground, and between switching the inductor from ground to the supply voltage. However, for high power efficiency, the dead time should be short. There is a trade-off in choosing the dead time. A short dead time is difficult to implement due to integrated circuit temperature and process variations that alter delays in circuitry, and conventionally the dead time should be long enough to encompass such variations. Therefore, there is a requirement for an improved switched mode power supply that can operate at a high switching frequency.

SUMMARY OF THE PREFERRED EMBODIMENTS

According to a first aspect there is provided a switched mode power supply comprising:
a reactive element;
a control signal generator arranged to generate a first control signal at a first output of the control signal generator and a second control signal at a second output of the control signal generator, wherein the first output of the control signal generator is coupled to a first input of a switching stage by means of a first control signal path and the second output of the control signal generator is coupled to a second input of the switching stage by means of a second control signal path;
wherein the switching stage is arranged to,
during first charging time periods,
responsive to the first control signal, couple the reactive element to a first supply voltage for charging the reactive element, and
responsive to the second control signal, decouple the reactive element from a second supply voltage lower than the first supply voltage,
during first discharging time periods,
responsive to the first control signal, decouple the reactive element from the first supply voltage, and
responsive to the second control signal, couple the reactive element to the second supply voltage for discharging the reactive element,
during decoupling time periods,
responsive to the first control signal, decouple the reactive element from the first supply voltage, and
responsive to the second control signal, decouple the reactive element from the second supply voltage,
wherein the first charging time periods and the first discharging time periods alternate and are each spaced apart by one of the decoupling time periods;
a delay detector arranged to generate a delay indicator signal indicative of a relative delay between the first control signal at the first input of the switching stage and the second control signal at the second input of the switching stage; and
an adjustable delay stage in one of the first and second signal paths and arranged to, responsive to the delay indicator signal, control an adjustable delay so that a first delay experienced by the first control signal passing from the first output of the control signal generator to the first input of the switching stage is substantially equal to a second delay experienced by the second control signal passing from the second output of the control signal generator to the second input of the switching stage.

According to a second aspect there is provided a method of operating a switched mode power supply, comprising:
generating a first control signal and a second control signal;
delivering the first control signal to a switching stage by means of a first control signal path and delivering the second control signal to the switching stage by means of a second control signal path;
employing the switching stage for,
during first charging time periods, charging a reactive element by,
responsive to the first control signal, coupling the reactive element to a first supply voltage, and,
responsive to the second control signal, decoupling the reactive element from a second supply voltage lower than the first supply voltage, during first discharging time periods, discharging the
reactive element by,
responsive to the first control signal, decoupling the
reactive element from the first supply voltage, and,
responsive to the second control signal, coupling the
reactive element to the second supply voltage,
during decoupling time periods,
responsive to the first control signal, decoupling the
reactive element from the first supply voltage, and,
responsive to the second control signal, decoupling
the reactive element from the second supply voltage;
wherein the first charging time periods and the first
discharging time periods alternate and are each spaced apart
by one of the decoupling time periods;
generating a delay indicator signal indicative of a relative
delay, at the switching stage, between the first control signal
and the second control signal; and
controlling, responsive to the delay indicator signal, an
adjustable delay in one of the first and second control signal
paths so that a first delay experienced by the first control
signal in the first control signal path is substantially equal to
a second delay experienced by the second control signal in
the second control signal path.

Controlling the adjustable delay so that the first delay
experienced by the first control signal in the first control
signal path is substantially equal to a second delay experienced by the second control signal in the second control
signal path enables the decoupling time periods, corresponding to dead time, to be short and of equal duration, thereby
enabling power efficiency to be high and enabling high
linearity. The high linearity enables a wireless communication device employing the switched mode power supply to
have a high spectral purity.

The reactive element may comprise a first terminal for
charging and discharging the reactive element, a second
terminal for an output voltage, an inductive element coupled
between the first and second terminals, and an output
capacitive element coupled to the second terminal. This
configuration enables the output capacitive element to be
charged and discharged via the first terminal and inductive
element, and enables an output voltage to be provided at the
second terminal.

The switching stage may comprise:
a first n-channel transistor coupled between a/the first
terminal of the reactive element and a first power
supply rail at the first supply voltage and having a first
gate coupled to the first input of the switching stage,
and
a second n-channel transistor coupled between the first
terminal of the reactive element and a second power
supply rail at the second supply voltage and having a
second gate coupled to the second input of the switching stage;
wherein the first n-channel transistor may be arranged,
responsive to the first control signal, to couple the first
terminal of the reactive element to a first power supply rail
at the first supply voltage during the first charging time
periods and to decouple the first terminal of the reactive
element from the first power supply rail during the first
discharging time periods and the decoupling time periods;
wherein the second n-channel transistor may be arranged,
responsive to the second control signal, to decouple the first
terminal of the reactive element from a second power supply
rail at the second supply voltage during the first charging
time periods and the decoupling time periods and to couple
the first terminal of the reactive element to the second power
supply rail during the first discharging time periods; and wherein the first control signal path may be arranged to
deliver the first control signal to the first input of the
switching stage at, during the first charging time periods, a
first drive voltage higher than the first supply voltage.

Likewise, the method may comprise:
providing the switching stage with a first n-channel transistor coupled between a/the first terminal of the reactive
element and a first power supply rail at the first supply
voltage and having a first gate arranged for receiving the first
control signal from the first control signal path;
providing the switching stage with a second n-channel
transistor coupled between the first terminal of the reactive
element and a second power supply rail at the second supply
voltage and having a second gate arranged for receiving the
second control signal from the second control signal path;
employing the first n-channel transistor to, responsive to
the first control signal, couple the first terminal of the
reactive element to a first power supply rail at the first supply
voltage during the first charging time periods and decouple
the first terminal of the reactive element from the first power
supply rail during the first discharging time periods and the
decoupling time periods;
employing the second n-channel transistor to, responsive
to the second control signal, decouple the first terminal of
the reactive element from a second power supply rail at the
second supply voltage during the first charging time periods
and the decoupling time periods and couple the first terminal
of the reactive element to the second power supply rail
during the first discharging time periods; and
delivering the first control signal to the gate of the first
n-channel transistor at, during the first charging time periods, a first drive voltage higher than the first supply voltage.

The use of the first drive voltage higher than the first
supply voltage enables the first transistor to be an n-channel
transistor, which enables improved performance with
respect to a p-channel transistor. In particular, an n-channel
transistor can be smaller than a p-channel transistor having
the same gain, which leads to lower resistance and hence
greater efficiency, and also lower parasitic capacitance,
which leads to lower drive power, and also lower output
capacitance, which can improve efficiency.

The switched mode power supply may comprise:
a first capacitive element having a first terminal coupled
to the first terminal of the reactive element and a second
terminal coupled to a first node; and
a first charging diode coupled between the first node and
a third power supply rail at a third supply voltage higher than
the second supply voltage, and arranged for charging the
first capacitive element from the third supply voltage;
wherein the first control signal path is coupled to the first
node and is arranged to determine the first drive voltage
dependent on a difference between a first node voltage at the
first node and a voltage at the first terminal of the reactive
element.

Likewise, the method may comprise:
providing a first capacitive element having a first terminal
coupled to the first terminal of the reactive element and a
second terminal coupled to a first node;
providing a first charging diode coupled between the first
node and a third power supply rail at a third supply voltage
higher than the second supply voltage;
charging the first capacitive element from the third supply
voltage; and
determining the first drive voltage dependent on a difference between a first node voltage at the first node and a
voltage at the first terminal of the reactive element.

This feature enables the first drive voltage to be determined despite variations in the voltage at the first terminal of the reactive element, such as can occur when the switched mode power supply is employed to deliver modulated power.

The first control signal path may comprise a first power supply input coupled to the first node and a second power supply input coupled to the first terminal of the reactive element, wherein the first control signal path is arranged to determine the first drive voltage dependent on the first node voltage and the voltage at the first terminal of the reactive element.

Likewise, the method may comprise providing the first control signal path with a first power supply input coupled to the first node and a second power supply input coupled to the first terminal of the reactive element, and arranged to determine the first drive voltage dependent on the first node voltage and the voltage at the first terminal of the reactive element.

This feature enables the first control signal path to determine the first drive voltage despite variations in the voltage at the first terminal of the reactive element, such as can occur when the switched mode power supply is employed to deliver modulated power.

The switched mode power supply may comprising a voltage regulator coupled to the first node and to a fourth power supply rail at a fourth supply voltage higher than the third supply voltage, and the voltage regulator may be arranged to control the first node voltage dependent on the fourth supply voltage.

Likewise, the method may comprise employing a voltage regulator to control the first node voltage dependent on a fourth supply voltage higher than the third supply voltage.

This feature can enable improved performance when the voltage at the first terminal of the reactive element varies, such as can occur when the switched mode power supply is employed to deliver modulated power.

The switched mode power supply may comprise:

a second capacitive element having a first terminal coupled to the first terminal of the reactive element and a second terminal coupled to a second node; and a second charging diode coupled between the second node and the fourth power supply rail and arranged for charging the second capacitive element from the fourth supply voltage;

and the voltage regulator may comprise a first regulator terminal coupled to the second node, a second regulator output coupled to the first node, and a third regulator terminal coupled to the first terminal of the reactive element, and the voltage regulator may be arranged to control the first node voltage dependent on a difference between a second node voltage at the second node and the voltage at the first terminal of the reactive element.

Likewise, the method may comprise:

providing a second capacitive element having a first terminal coupled to the first terminal of the reactive element and a second terminal coupled to a second node;

providing a second charging diode coupled between the second node and the fourth power supply rail;

charging the second capacitive element from the fourth supply voltage; and employing the voltage regulator to control the first node voltage dependent on a difference between a second node voltage at the second node and the voltage at the first terminal of the reactive element.

This feature can enable improved performance when the voltage at the first terminal of the reactive element varies, such as can occur when the switched mode power supply is employed to deliver modulated power, and in particular can enable improved power efficiency.

The delay detector may comprise a delay detection capacitive element coupled to a charge control circuit, wherein the charge control circuit is arranged to alternately charge the delay detection capacitive element during second charging time periods of duration dependent on the first delay and discharge the delay detection capacitive element during second discharging time periods of duration dependent on the second delay, and the delay indication signal may be dependent on a voltage across the delay detection capacitive element.

Likewise, in the method, generating the delay indicator signal may comprise alternately charging a delay detection capacitive element during second charging time periods of duration dependent on the first delay and discharging the delay detection capacitive element during second discharging time periods of duration dependent on the second delay, and the delay indication signal may be dependent on a voltage across the delay detection capacitive element.

This feature enables the delay indication signal to be generated in a low complexity manner.

In a first preferred embodiment, the charge control circuit may comprise:

a first comparison circuit arranged to determine the duration of the second charging time periods dependent on a time difference between the first control signal at the first output of the control signal generator and the first control signal at the first input of the switching stage; and a second comparison circuit arranged to determine the duration of the second discharging time periods dependent on a time difference between the second control signal at the second output of the control signal generator and the second control signal at the second input of the switching stage.

Likewise, in a first preferred embodiment the method may comprise:

determining the duration of the second charging time periods dependent on a time difference between the first control signal as generated and the first control signal as delivered to the switching stage; and determining the duration of the second discharging time periods dependent on a time difference between the second control signal as generated and the second control signal as delivered to the switching stage.

These first preferred embodiments enable the delay indication signal to be generated in a low complexity manner.

In a second preferred embodiment, the charge control circuit may comprise:

a third n-channel transistor coupled to a third node, and a fourth n-channel transistor coupled to the third node, wherein the charge control circuit is arranged to generate a shadow signal at the third node by switching the third n-channel transistor responsive to the first control signal at the first input of the switching stage and switching the fourth n-channel transistor responsive to the second control signal at the second input of the switching stage;

a first comparison circuit arranged to determine the duration of the second charging time periods dependent on a time difference between the first control signal at the first output of the control signal generator and the shadow signal; and a second comparison circuit arranged to determine the duration of the second discharging time periods dependent on a time difference between the second control signal at the second output of the control signal generator and the shadow signal.

Likewise, in a second preferred embodiment the method may comprise:

providing a third n-channel transistor coupled to a third node, and a fourth n-channel transistor coupled to the third node, generating a shadow signal at the third node by switching the third n-channel transistor responsive to the first control signal as generated and switching the fourth n-channel transistor responsive to the second control signal as generated;

determining the duration of the second charging time periods dependent on a time difference between the first control signal as generated and the shadow signal; and determining the duration of the second discharging time periods dependent on a time difference between the second control signal as generated and the shadow signal.

These second preferred embodiments enable the delay indication signal to be determined with improve accuracy, in particular when the switched mode power supply is employed to deliver modulated power, thereby enabling the decoupling time periods to be short, leading to improved power efficiency.

The first comparison circuit may be a logical AND gate. Similarly, the second comparison circuit may be a logical AND gate. This feature enables low complexity implementation.

There is also provided an amplifier, for example an envelope tracking amplifier, comprising a switched mode power supply according to the first aspect. There is also provided a wireless communication device comprising the amplifier.

BRIEF DESCRIPTION OF THE DRAWINGS

Preferred embodiments will now be described, by way of example only, with reference to the accompanying drawings, in which.

DETAILED DESCRIPTION OF PREFERRED EMBODIMENTS

Figure 1:
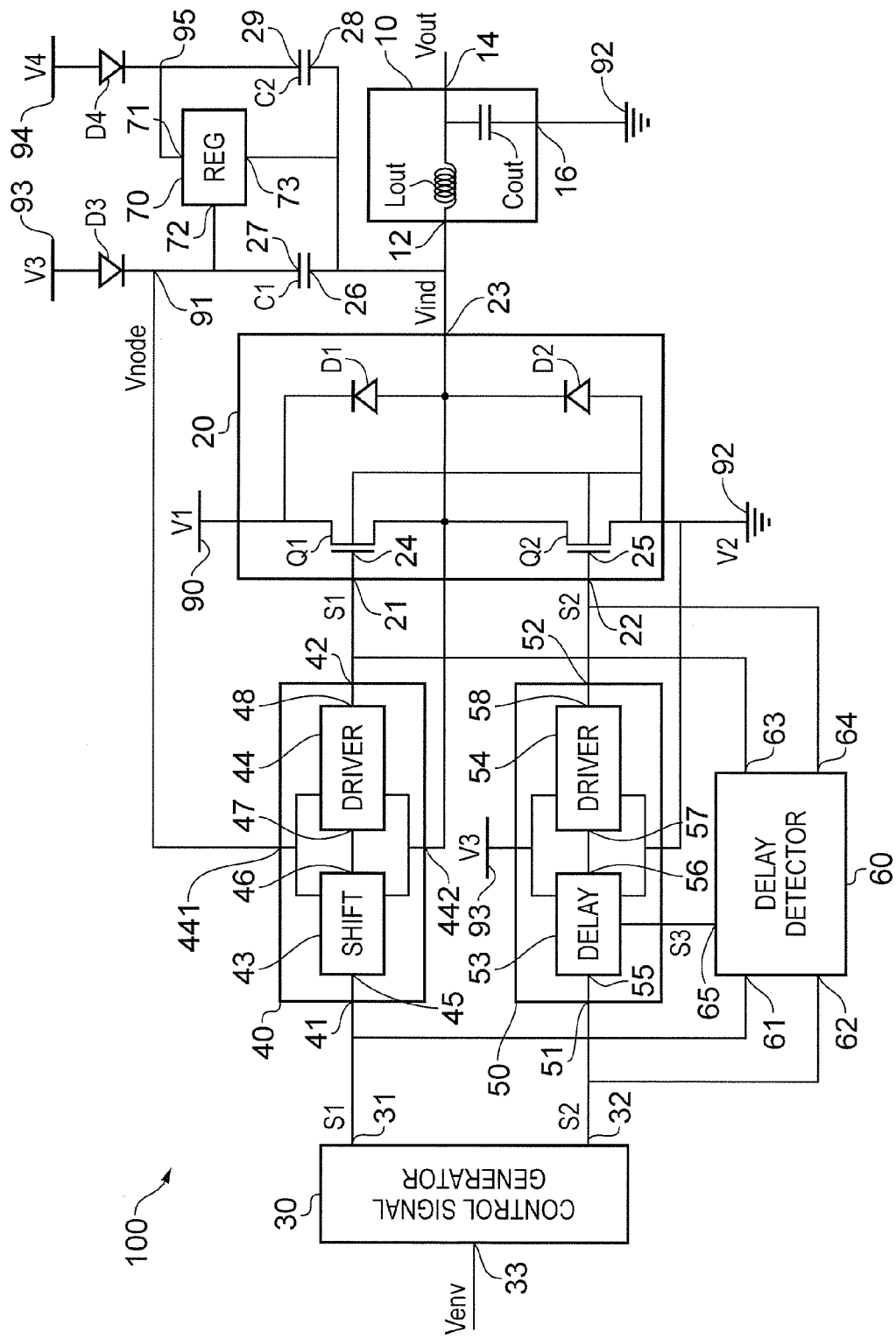
FIG. 1 is a schematic diagram of a switched mode power supply.

Referring to FIG. 1, a switched mode power supply 100 comprises a reactive element 10 having a first terminal 12, a second terminal 14, an output capacitive element Cout coupled to the second terminal 14 of the reactive element 10, and an inductive element Lout coupled between the first terminal 12 and the second terminal 14 of the reactive element 10. A control signal generator 30 has an input 33 for an input signal Venv. The control signal generator 30 generates the first control signal S1 that it delivers at a first output 31 of the control signal generator 30 and the second control signal S2 that it delivers at a second output 32 of the control signal generator 30. A switching stage 20 has a first input 21 for the first control signal S1, a second input 22 for the second control signal S2, and a terminal 23 coupled to the first terminal 12 of the reactive element 10.

The first output 31 of the control signal generator 30 is coupled to the first input 21 of the switching stage 20 by means of a first control signal path 40 for conveying the first control signal S1 to the switching stage 20, and the second output 32 of the control signal generator 30 is coupled to the second input of the switching stage 20 by means of a second control signal path 50 for conveying the second control signal S2 to the switching stage 20. More particularly, the first output 31 of the control signal generator 30 is coupled to an input 41 of the first control signal path 40, and an output 42 of the first control signal path 40 is coupled to the first input 21 of the switching stage 20. Correspondingly, the second output 32 of the control signal generator 30 is coupled to an input 51 of the second control signal path 50, and an output 52 of the second control signal path 50 is coupled to the second input of the switching stage 20.

Figure 2:
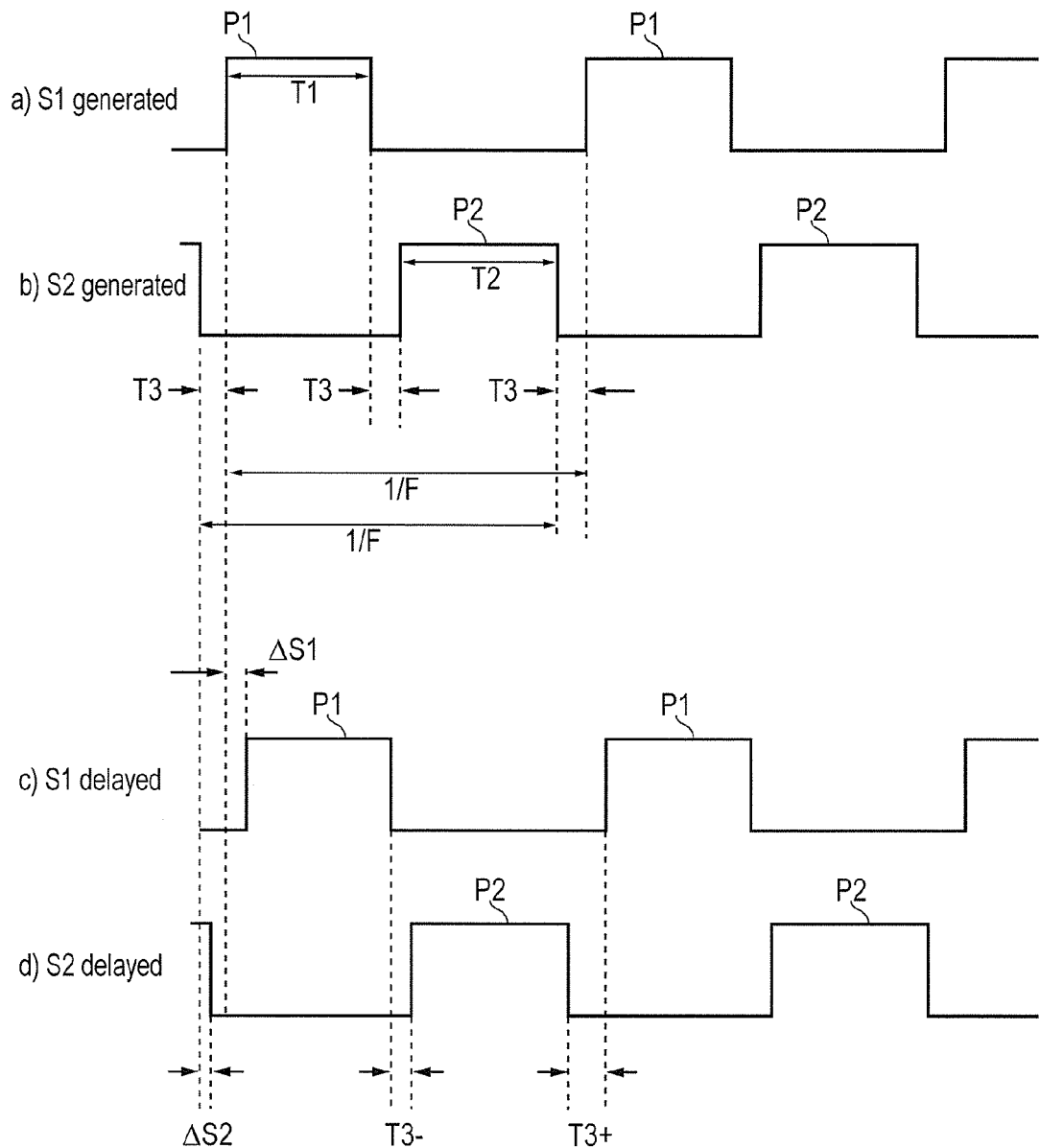
FIG. 2 illustrates waveforms of signals.

Referring to FIG. 2, waveform a) is a waveform the first control signal S1 at the first output 32 of the control signal generator 30, and waveform b) is a waveform of the second control signal S2 at the second output 33 of the control signal generator 30. The first control signal S1 has first pulses P1 having a first pulse duration T1, and the second control signal S2 has second pulses P2 having a second pulse duration T2. Both the first and second control signals S1, S2 are periodic, having a common and constant pulse repetition rate, that is, pulse frequency F, and a common period 1/F. The first and second control signals S1, S2 have, therefore, a constant time between the start of each of the first pulses P1 and a constant time between the start of each of the second pulses P2. The first pulses P1 do not overlap in time the second pulses P2, each first pulse P1 occurring in a gap between two consecutive second pulses P2, and each second pulse P2 occurring in a gap between two consecutive first pulses P1. There are intervals T3 between the end of each first pulse P1 and the start of the next second pulse P2, and between the end of each second pulse P2 and the start of the next first pulse. The intervals T3 have a constant duration. However, the control signal generator 30 is arranged to control the first and second pulse durations T1, T2 dependent on the input signal Venv at the input 33 of the control signal generator 30. When the input signal Venv increases, the first pulse duration T1 increases and the second pulse duration decreases, thereby maintaining constant the interval T3 and the pulse frequency F, and when the input signal Venv decreases, the first pulse duration T1 decreases and the second pulse duration increases, also maintaining constant the interval T3 and the pulse frequency F.

Referring again to FIG. 1, the switching stage 20 comprises a first transistor Q1 coupled between the first terminal 12 of the reactive element 10 and a first power supply rail 90 at a first supply voltage V1. The first transistor Q1 has a first gate 24 coupled to the first input 21 of the switching stage 20. The first transistor Q1, in response to the first control signal S1, adopts a conducting state for the first pulse duration T1 thereby coupling the first terminal 12 of the reactive element 10 to the first power supply rail 90, during which time the output capacitive element Cout charges via the output inductive element Lout, and for the remainder of the common period 1/F adopts a non-conducting state thereby decoupling the first terminal 12 of the reactive element 10 from the first power supply rail 90. The first pulse duration T1 is, therefore, a first charging time period. The switching stage 20 comprises a second transistor Q2 coupled between the first terminal 12 of the reactive element 10 and a second power supply rail 92 at a second supply voltage V2 which is lower than the first supply voltage V1, and which in FIG. 1 is illustrated as a ground. The second transistor Q2 has a second gate 25 coupled to the second input 22 of the switching stage 20. The second transistor Q2, in response to the second control signal S2, adopts a conducting state for the second pulse duration T2 thereby coupling the first terminal 12 of the reactive element 10 to the second power supply rail 92, during which time the output capacitive element Cout discharges via the output inductive element Lout, and for the remainder of the common period 1/F adopts a non-conducting state thereby decoupling the first terminal 12 of the reactive element 10 from the second power supply rail 92. The second pulse duration T2 is, therefore, a first discharging time period. An output voltage Vout at the second terminal 14 of the reactive element 10 is indicative of the charge in the reactive element 10, or more specifically in the output capacitive element Cout. As the input signal Venv at the input 33 of the control signal generator 30 varies, the first and second pulse durations T1, T2 vary causing the first charging and first discharging periods to vary, and therefore the output voltage Vout is indicative of the input signal Venv. The intervals T3 are provided to ensure that the first terminal 12 of the reactive element 10 is not simultaneously coupled to both the first power supply rail 90 and the second power supply rail 92, which could cause a large current to flow from the first power supply rail 90 to the second power supply rail 92 and thereby damage the switched mode power supply 100. The intervals T3 are, therefore, decoupling time periods, during which the first terminal 12 of the reactive element 10 is decoupled from both the first and second power supply rails 90, 92.

In this way, therefore, the switching stage 20 is arranged to, during the first charging time periods, responsive to the first control signal S1 couple the reactive element 10 to the first supply voltage V1 for charging the output capacitive element Cout of the reactive element 10 and responsive to the second control signal S2 decouple the reactive element 10 from the second supply voltage V2 which is lower than the first supply voltage V1, during first discharging time periods, responsive to the first control signal S1 decouple the reactive element 10 from the first supply voltage V1 and responsive to the second control signal S2 couple the reactive element 10 to the second supply voltage V2 for discharging the output capacitive element Cout of the reactive element 10, and during decoupling time periods, responsive to the first control signal S1 decouple the reactive element 10 from the first supply voltage V1 and responsive to the second control signal S2 decouple the reactive element 10 from the second supply voltage V2. The first charging time periods and the first discharging time periods alternate, and successive ones of the first charging time periods and first discharging time periods are spaced apart by one of the decoupling time periods.

It is desirable for the intervals T3, corresponding to the decoupling time periods, to be short, in order to enable high power efficiency, enable a highly linear relationship between the input signal Venv and the output voltage Vout, and enable a high dynamic range of the switched mode power supply 100. However, the selection of a value for the intervals T3 should take into account different delays experienced by the first and second control signals S1, S2 in, respectively, the first and second control signal paths 40, 50. When the switched mode power supply 100 is implemented in an integrated circuit, these delays can vary due to temperature and process variations, and, as explained below, can also vary due to variation of the input signal Venv.

A substrate of the first and second transistors Q1, Q2 is coupled to the second power supply rail 92. A first protection device D1, in particular a diode, is coupled between the first power supply rail 90 and the first terminal 12 of the reactive element 10, and is arranged to protect the first transistor Q1 should the voltage at the input 12 of the reactive element 10, referred to as the inductor node voltage Vind, reach a high value with respect to the first supply voltage V1. A second protection device D2, in particular a diode, is coupled between the second power supply rail 92 and the first terminal 12 of the reactive element 10, and is arranged to protect the second transistor Q2 should the inductor node voltage Vind at the first terminal 12 of the reactive element 10 reach a low value with respect to the second supply voltage V2.

A delay detector 60 has a first input 61 coupled to the first output 31 of the control signal generator 30 for receiving the first control signal S1, a second input 62 coupled to the second output 32 of the control signal generator 30 for receiving the second control signal S2, a third input 63 coupled to the first input 21 of the switching stage 20 for receiving the first control signal S1 after it has passed through the first control signal path 40, and a fourth input 64 coupled to the second input 22 of the switching stage 20 for receiving the second control signal S2 after it has passed through the second control signal path 50. The first control signal S1 and the second control signal S2 may undergo different delays in, respectively, the first and second control signal paths 40, 50. The delay detector 60 is arranged to generate a delay indicator signal S3 indicative of a relative delay between the first control signal S1 at the first input 21 of the switching stage 20 and the second control signal S2 at the second input 22 of the switching stage 20. It may do this by comparing the first control signal S1 at its first input 61 and at its third input 63 to determine a first delay $\Delta S1$ of the first control signal S1, and by comparing the second control signal S2 at its second input 62 and its fourth input 64 to determine a second delay $\Delta S2$ of the second control signal S2, and generating the delay indicator signal S3 indicative of a difference between the first delay $\Delta S1$ and the second delay $\Delta S2$. The delay detector 60 delivers the delay indicator signal S3 at an output 65 of the delay detector 60.

The second signal path 50 comprises an adjustable delay stage 53 coupled between the input 51 of the second control signal path 50 and the output 52 of the second control signal path 50 for delaying the second control signal S2 by an adjustable delay. The output 65 of the delay detector 60 is coupled to a control input 59 of the adjustable delay stage 53, and the adjustable delay stage 53 controls the adjustable delay in response to the delay indicator signal S3 in order to reduce the difference between the first delay $\Delta S1$ and the second delay $\Delta S2$. In this way, the adjustable delay stage 53 compensates, partially or fully, for the difference in delay of the first and second control signals S1, S2 in, respectively, the first and second control signal paths 40, 50, thereby ensuring that the first and second control signals S1, S2 are delivered to the switching stage 20 with no, or only a small, difference in delay. The adjustable delay stage 53 may be implemented as, for example, a plurality of inverter elements coupled in series and powered by power supply voltages which are controlled dependent on the delay indicator signal S3. Typically, an even number of the inverter elements can be used, so that the second control signal S2 at the output 56 of the adjustable delay stage 53 is not inverted with respect to the second control signal S2 at the input 55 of the adjustable delay stage 53. Typically, positive and negative power supply voltages of the adjustable delay stage 53 can be controlled in opposite directions dependent on the delay indicator signal S3, such that the mean value of the positive and negative power supply voltages is constant.

Referring to FIG. 2, waveform c) is a waveform of the first control signal S1 at the output 42 of the first control signal path 40, delayed, with the respect to the first control signal S1 at the input 41 of the first control signal path 40, by the first delay ΔS1, and waveform b) is a waveform of the second control signal S2 at the second output 52 of the second control signal path 50, prior to the compensation by the adjustable delay stage 53, delayed, with the respect to the second control signal S2 at the input 51 of the second control signal path 50, by the second delay ΔS2, where ΔS1 is greater than ΔS2. A consequence of the first and second delays ΔS1, ΔS2 being different is that the interval T3 between the end of each first pulse P1 and the beginning of the next second pulse P2 is decreased, and therefore denoted T3− in FIG. 2, and the interval T3 between the end of each second pulse P2 and the beginning of the next first pulse P1 is increased, and therefore denoted T3+ in FIG. 2. The operation of the adjustable delay stage 53 compensates, partially or fully, for the difference between T3+ and T3−, tending to restore these to the value of T3.

In the embodiment illustrated in FIG. 1, without the adjustable delay provided by the adjustable delay stage 53, the first control signal path 40 would introduce a greater delay than the second control signal path 50. In other embodiments, the adjustable delay stage 53 may instead be provided in the first control signal path 40 if, without the adjustable delay provided by the adjustable delay stage 53, the second control signal path 50 would introduce a greater delay than the first control signal path 40. Therefore, the adjustable delay stage 53, in one of the first and second signal paths 40, 50, is arranged to, responsive to the delay indicator signal, control the adjustable delay so that the first delay ΔS1 experienced by the first control signal S1 passing from the first output 31 of the control signal generator 30 to the first input 21 of the switching stage 20 may be substantially equal to the second delay ΔS2 experienced by the second control signal S2 passing from the second output 32 of the control signal generator 30 to the second input 22 of the switching stage 20.

In the embodiment of FIG. 1, the first transistor Q1 and the second transistor Q2 are both n-channel transistors, although in other embodiments the first transistor Q1 may be a p-channel transistor and the second transistor Q2 may an n-channel transistor. The use of an n-channel transistor for the first transistor Q1 is advantageous in enabling a higher power efficiency of the switched mode power supply 100. During the charging periods, the inductor node voltage Vind at the first terminal 12 of the reactive element 10 is pulled up towards the first supply voltage V1. The use of an n-channel transistor for the first transistor Q1 requires the first control signal S1 during the first charging time periods, that is during the first pulses P1 of the first control signal S1, to be delivered to the first gate 24 at a first drive voltage that is positive, during the charging periods, with respect to the inductor node voltage Vind, and therefore is higher than the first supply voltage V1, which may be a battery voltage at, for example, 6 volts. Therefore, the first drive voltage of the first control signal at the output 42 of the first control signal path 40 can be higher than a voltage of the first control signal S1 at the first output 31 of the control signal generator 30, and higher than a voltage of the second control signal S2, during the discharging time periods, at the second output 32 of the control signal generator 30 and higher than a second drive voltage of the second control signal S2 at the output 52 of the second control signal path 50. In order to provide such a higher voltage, the switched mode power supply 100 comprises a first capacitive element C1 coupled between the first terminal 12 of the reactive element 10 and a first node 91, and a first charging diode D3 is coupled between the first node 91 and a third power supply rail 93 which is at a third supply voltage V3 higher than the second supply voltage V2. During the discharging time periods, the inductor node voltage Vind is decreased towards the second supply voltage V2 of the second power supply rail 92 because the second transistor Q2 is in a conducting state, and the first transistor Q1 is in a non-conducting state. This results in the first capacitive element C1 being charged from the third power supply rail 93 via the first charging diode D3 to a first node voltage Vnode. During the charging time periods, the second transistor Q2 is in a non-conducting state and the first transistor Q1 is in a conducting state, which results in the inductor node voltage Vind being increased towards the first voltage V1 of the first power supply rail 90. Consequently, the first node voltage Vnode at the first node 91 is raised. The value of the first node voltage Vnode to which the first node 91 is raised depends on the duty cycle of the first and second control signals S1, S2, which in turn depends on the input signal Venv at the input 33 of the control signal generator 30, and can be up to the sum of the first supply voltage V1 plus the first node voltage Vnode reached during a charging time period less a threshold voltage of the first charging diode D3, and so can exceed the first supply voltage V1.

The first control signal path 40 is powered by having a first power supply input 441 coupled to the first node 91 which is at the first node voltage Vnode, and a second power supply input 442 coupled to the first terminal 12 of the reactive element 10 which is at the inductor node voltage Vind, and so is powered at a voltage equal to a voltage across the first capacitive element C1. Both the inductor node voltage Vind and the first node voltage Vnode vary as the reactive element 10 is charged and discharged, and also as the input signal Venv varies. The first control signal path 40 is therefore able to provide the first control signal S1 to the first input 21 of the switching stage 20, and therefore to the first gate 24 of the first transistor Q1, at a voltage which is higher during the charging time periods than the first supply voltage V1. More particularly, the first control signal path 40 comprises a level shifting circuit 43 having an input 45 coupled to the input 41 of the first control signal path 40 and an output 46 coupled to an input 47 of a first driver 44. The first driver 44 has an output 48 coupled to the output 42 of the first control signal path 40. The level shifting circuit 43 increases the voltages of the first control signal S1, and the first driver 44 operates at these increased voltages. In this way, the first control signal path 40 is arranged to determine the voltage of the first control signal S1 delivered to the first input 21 of the switching stage 20, dependent on a difference between the first node voltage Vnode and the inductor node voltage Vind.

In contrast, the second control signal path 50 is powered by being coupled to the second power supply rail 92 at the second voltage V2, and the third power supply rail 93 at the third supply voltage V3. The adjustable delay stage 53 has an input 55 coupled to the input 51 of the second control signal path 50 and an output 56 coupled to an input 57 of a second driver 54. An output 58 of the second driver 54 is coupled to the output 52 of the second control signal path 50. The second driver 54 delivers the second control signal S2 to the second input 22 of the switching stage 20, and therefore to the second gate 25 of the second transistor Q2, at a voltage which is lower during the discharging time periods than the voltage of the first control signal S1 at the first gate 24 of the first transistor Q1 during the charging time periods.

The voltage at the first terminal 12 of the reactive element 10 is dependent on the duty cycle of the first and second control signals S1, S2, which are dependent on the input signal at the input 33 of the control signal generator 30. This can result in variation in the first node voltage Vnode at the first node 91 as the input signal Venv varies, and variation in the time required to charge the first capacitive element C1. This, in turn, can lead to a variation in the delay of the first control signal S1 in the first signal control path 40. This variation in delay may occur too fast to be compensated, or fully compensated, by the adjustable delay stage 53 in the manner described above, as the delay adjustment may be slow in relation to the changes in the input signal Venv. Moreover, the time available for charging the first capacitive element C1 depends on the duty cycle of the first and second control signals S1, S2, and the need to ensure sufficient time for charging the first capacitive element C1 places a constraint on the range of duty cycle values that may be used, which constrains linearity and power efficiency.

Further improvements can be provided by a voltage regulator 70 that has an input 71 coupled, by means of a second charging diode D4 to a fourth power supply rail 94 which is at a fourth supply voltage V4 higher than the third supply voltage V3. The input 71 of the voltage regulator 70 is also coupled to the first terminal 12 of the reactive element 10 by means of a second capacitive element C2. A port 73 of the voltage regulator 70 is coupled to the first terminal 12 of the reactive element 10. The second charging diode D4 is arranged for charging the second capacitive element C2 from the fourth power supply rail 94. An output 72 of the voltage regulator 70 is coupled to the first node 91. The voltage regulator 70 is arranged to reduce the variations of the first node voltage Vnode at the first node 91. This reduces the variations in the charging time of the first capacitive element C1, and also enables a higher mean value of the first node voltage Vnode to be provided, thereby enabling the speed of charging the first capacitive element C1 to be increased, enabling a greater range of duty cycle values to be used. This can also lead to further improved power efficiency by enabling the first power supply rail V1 to operate at a lower value of the first supply voltage V1. Power efficiency can be optimum if most of the current drawn at the first node 91 by the first control signal path 40 is supplied from the third power supply rail 93, and current is drawn from fourth power supply rail 94 via the voltage regulator 70 only when the duty cycle of the first or second control signals S1, S2 is close to 100%.

Figure 3:
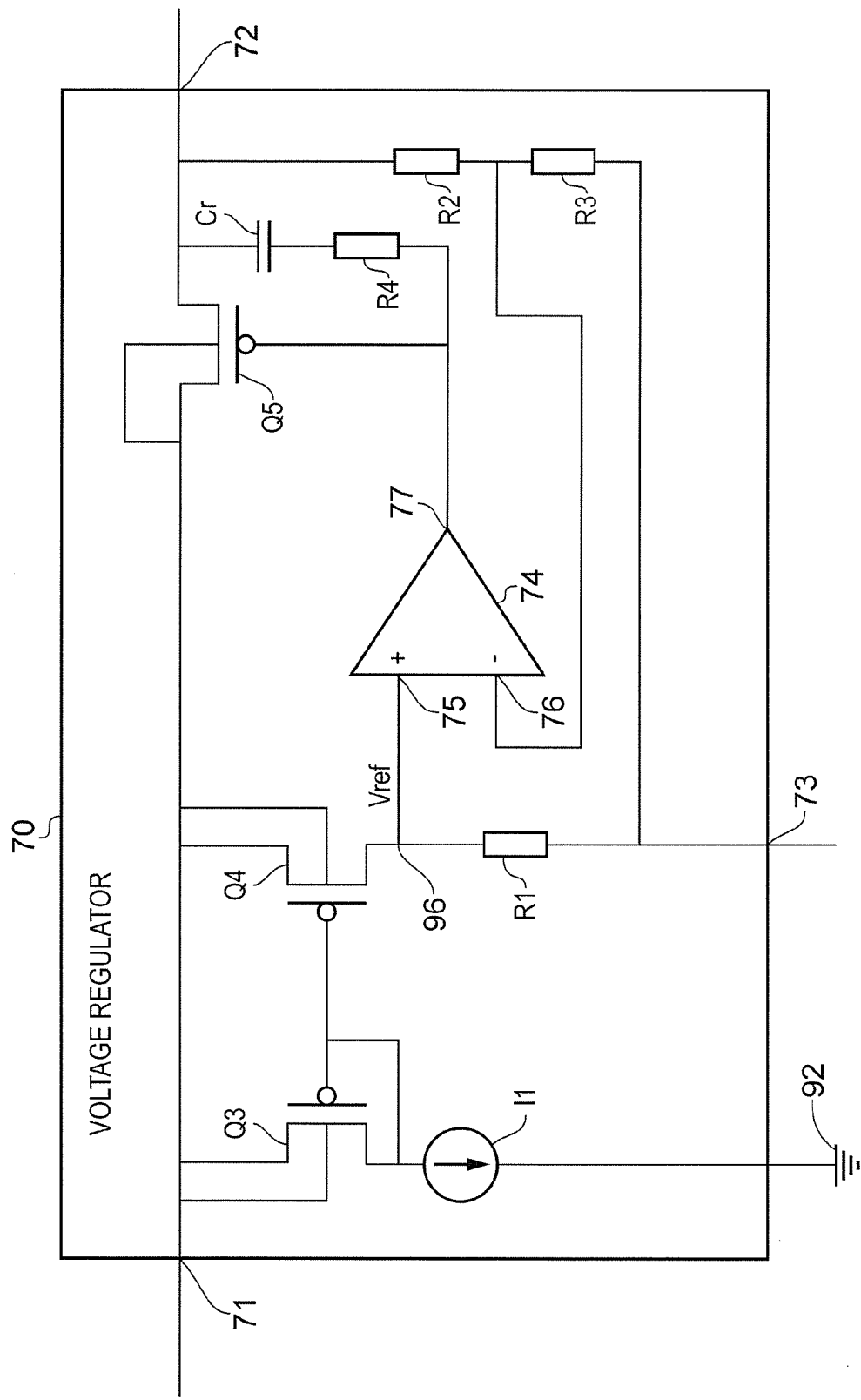
FIG. 3 is a schematic diagram of a voltage regulator.

An embodiment of the voltage regulator 70 is illustrated in FIG. 3, although alternative embodiments may be employed. Referring to FIG. 3, a third transistor Q3 is coupled in series with a first current source 11 between the first input 71 of the voltage regulator 70 and the second power supply rail 92. A fourth transistor Q4 is coupled between the first input 71 of the voltage regulator 70 and a reference node 96, and a first resistor R1 is coupled between the reference node 96 and the port 73 of the voltage regulator 70. A gate of the third transistor Q3 and a gate of the fourth transistor Q4 are coupled together and to a drain of the third transistor Q3. A source of the third transistor Q3 and a source of the fourth transistor Q4 are coupled to the input 71 of the voltage regulator 70. The third transistor Q3, first current source 11, fourth transistor Q4 and the first resistor R1 are arranged as a current mirror and establish a reference voltage Vref at the reference node 96. A fifth transistor Q5 is coupled between the input 71 and the output 72 of the voltage regulator 70. Second and third resistors R2, R3, are coupled between the output 72 of the voltage regulator 70 and the port 73 of the voltage regulator 70. An amplifier 74 has a non-inverting input 75 coupled to the reference node 96 for receiving the reference voltage Vref, and an inverting input 76 coupled to a junction between the second and third resistors R2, R3 for sampling a fraction of the first node voltage Vnode at the output 72 of the voltage regulator 70. An output 77 of the amplifier 74 is coupled to a gate of the fifth transistor Q5 for controlling the gain of the fifth transistor Q5. A fourth resistor R4 and a regulator capacitive element Cr are coupled in series between the output 77 of the amplifier 74 and the output 72 of the voltage regulator 70 for smoothing voltage variations at the output 72 of the voltage regulator 70.

Figure 4:
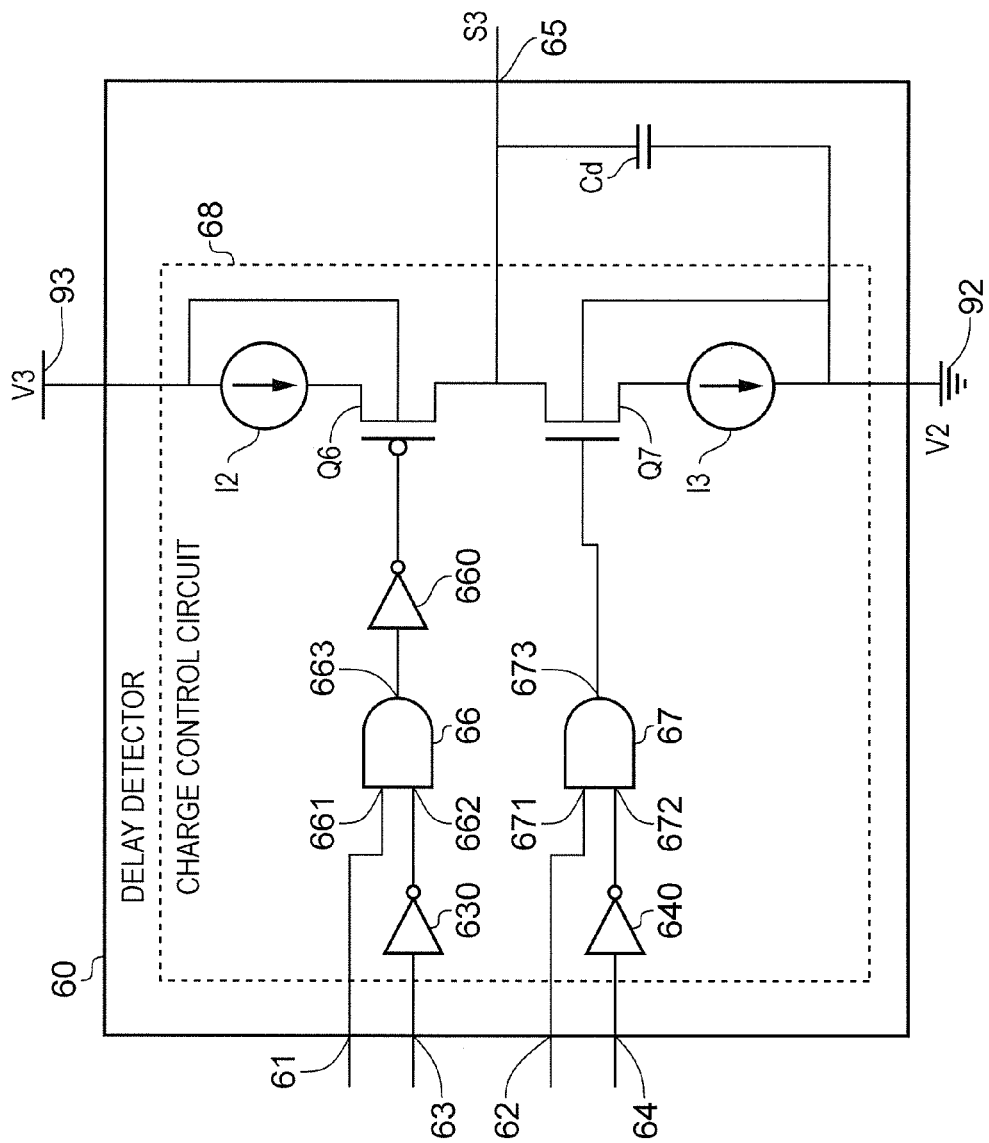
FIG. 4 is a schematic diagram of a delay detector.

Referring to FIG. 4, the delay detector 60 comprises a sixth transistor Q6, which is a p-channel MOSFET, having a drain terminal coupled to the third power supply rail 93 by means of a second current source 12 and a source terminal coupled to the output 65 of the delay detector 60. A seventh transistor Q7, which is an n-channel MOSFET, has a drain terminal coupled to the output 65 of the delay detector 60 and a source terminal coupled to the second power supply rail 92 by means of a third current source 13. A detector capacitive element Cd is coupled between the output 65 of the delay detector 60 and the second power supply rail 92. The second and third current sources 12, 13 are matched, such that they provide the same current when the same voltage difference is applied across their respective terminals. The detector capacitive element Cd is charged when the sixth transistor Q6 is in a conductive state and the seventh transistor Q7 is in a non-conductive state, and is discharged when the sixth transistor Q6 is in a non-conductive state and the seventh transistor Q7 is in a conductive state. The delay detector 60 receives the first control signal S1 at its first input 61, and a delayed version of the first control signal S1, having been transmitted through the first control signal path 40, at its third input 63. A first AND gate 66 has a first input 661 coupled to the first input 61 of the delay detector 60, and a second input 662 coupled to the third input 63 of the delay detector 60 by means of a first inverter 630. A signal at an output 663 of the first AND gate 66 has a duty cycle that is indicative of the first delay ΔS1 experienced by the first control signal S1 whilst being transmitted through the first control signal path 40, and, after inversion by a second inverter 660, is applied to a gate terminal of the sixth transistor Q6, thereby switching the sixth transistor Q6 into a conducting state for a period of time corresponding to the first delay ΔS1 experienced by the first control signal S1 whilst being transmitted through the first control signal path 40. Similarly, the delay detector 60 receives the second control signal S2 at its second input 62, and a delayed version of the second control signal S2, having been transmitted through the second control signal path 50, at its fourth input 64. A second AND gate 67 has a first input 671 coupled to the second input 62 of the delay detector 60, and a second input 672 coupled to the fourth input 64 of the delay detector 60 by means of a third inverter 640. A signal at an output 673 of the second AND gate 67 has a duty cycle that is indicative of the second delay ΔS2 experienced by the second control signal S2 whilst being transmitted through the second control signal path 50, and, is applied to a gate terminal of the seventh transistor Q7, thereby switching the seventh transistor Q7 into a conducting state for a period of time corresponding to the second delay ΔS2 experienced by the second control signal S2 whilst being transmitted through the second control signal path 50. The detector capacitive element Cd operates as an integrator. The average charge on the detector capacitive element Cd, and consequently the delay indicator signal S3 at the output 65 of the delay detector 60, is indicative of the difference, $\Delta S1-\Delta S2$, in delay between the first control signal S1 being transmitted through the first control signal path 40 and the second control signal S2 being transmitted through the second control signal path 50. By applying the delay indicator signal S3 to adjust the adjustable delay provided by the adjustable delay stage 53, a loop is formed which drives this difference in delay to zero. Such an embodiment of the delay detector 60 that operates by charging the detector capacitive element Cd may also be referred to as a charge time detector (CDT). Therefore, in the embodiment described with reference to FIG. 4, the first AND gate 66 is a first comparison circuit which is arranged to determine the duration of the second charging time periods dependent on a time difference, corresponding to the first delay $\Delta S1$, between the first control signal S1 at the first output 31 of the control signal generator 30 and the first control signal S1 at the first input 21 of the switching stage 20, and the second AND gate 67 is a second comparison circuit 67 arranged to determine the duration of the second discharging time periods dependent on a time difference, corresponding to the second delay $\Delta S2$, between the second control signal S2 at the second output 32 of the control signal generator 30 and the second control signal at the second input 22 of the switching stage 20.

In the case of the delay detector 60 described with reference to FIG. 4, in embodiments of the switched mode power supply 100 where the first transistor Q1 is an n-channel transistor and the first control signal S1 applied at the first gate 24 is at the first drive voltage which is higher than the first supply voltage V1, the first control signal S1 applied at the third input 63 of the delay detector 60 has different voltage levels than the first control signal S1 applied at the first input 61 of the delay detector 60. Therefore, it can be advantageous to employ, for delay detection, an alternative to the first control signal S1 at the first drive voltage.

Also in the case of the delay detector 60, in embodiments of the switched mode power supply 100 where the first control signal path 40 is powered from the inductor node voltage Vind at the first terminal 12 of the reactive element 10 and by the first node voltage Vnode at the first node 91, the inductor node voltage Vind and the first node voltage Vnode both toggle at the pulse frequency F. The inductor node voltage Vind can toggle between the first voltage V1, or close to the first voltage V1, and the second voltage V2, or close to the second voltage, and the first node voltage Vnode tracks these changes, remaining higher than the inductor node voltage Vind by the voltage across the first capacitive element C1. Moreover, the inductor node voltage Vind, and current flowing to and from the reactive element 10 at the first terminal 12 of the reactive element 10, and also the first node voltage Vnode, all vary dependent on the input signal Venv. The effect of these variations is that tracking of transitions in the first control signal S1 by the first inverter 630 may be unreliable, leading to an error in the detected delay, and therefore an error in the delay indicator signal S3. Therefore, it can be advantageous to employ a delay detector 60 that provides some protection from these variations when detecting the delay.

Figure 5:
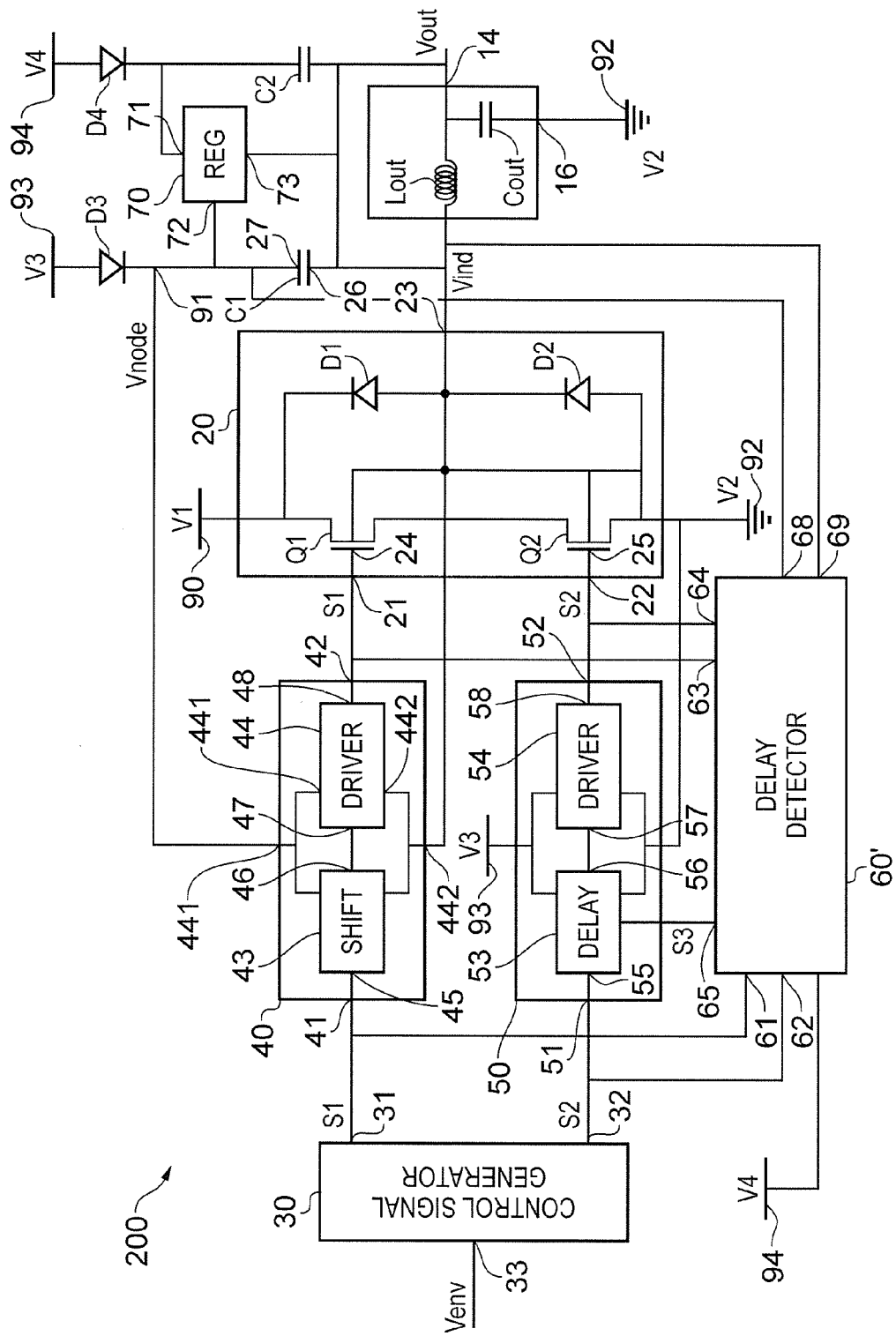
FIG. 5 is a schematic diagram of a switched mode power supply.

Referring to FIG. 5, a switched mode power supply 200 is identical to the switched mode power supply 100 described with reference to FIG. 1, except that it employs a delay detector 60' having a different embodiment than the delay detector 60 described with reference to FIGS. 1 and 5, and is arranged in the switched mode power supply 200 in a different way, in order to address the disadvantages described above. Only the differences between the switched mode power supplies 100, 200 and between the embodiments of the delay detectors 60, 60' are described below.

In addition to the first to fourth inputs 61, 62, 63, 64 and output 65 as described in relation to the delay detector 60, the delay detector 60' comprises a fifth input 68 coupled to the first node 91 for receiving the first node voltage Vnode, and a sixth input 69 coupled to the first terminal 12 of the reactive element 10 for receiving the inductor node voltage Vind.

Figure 6:
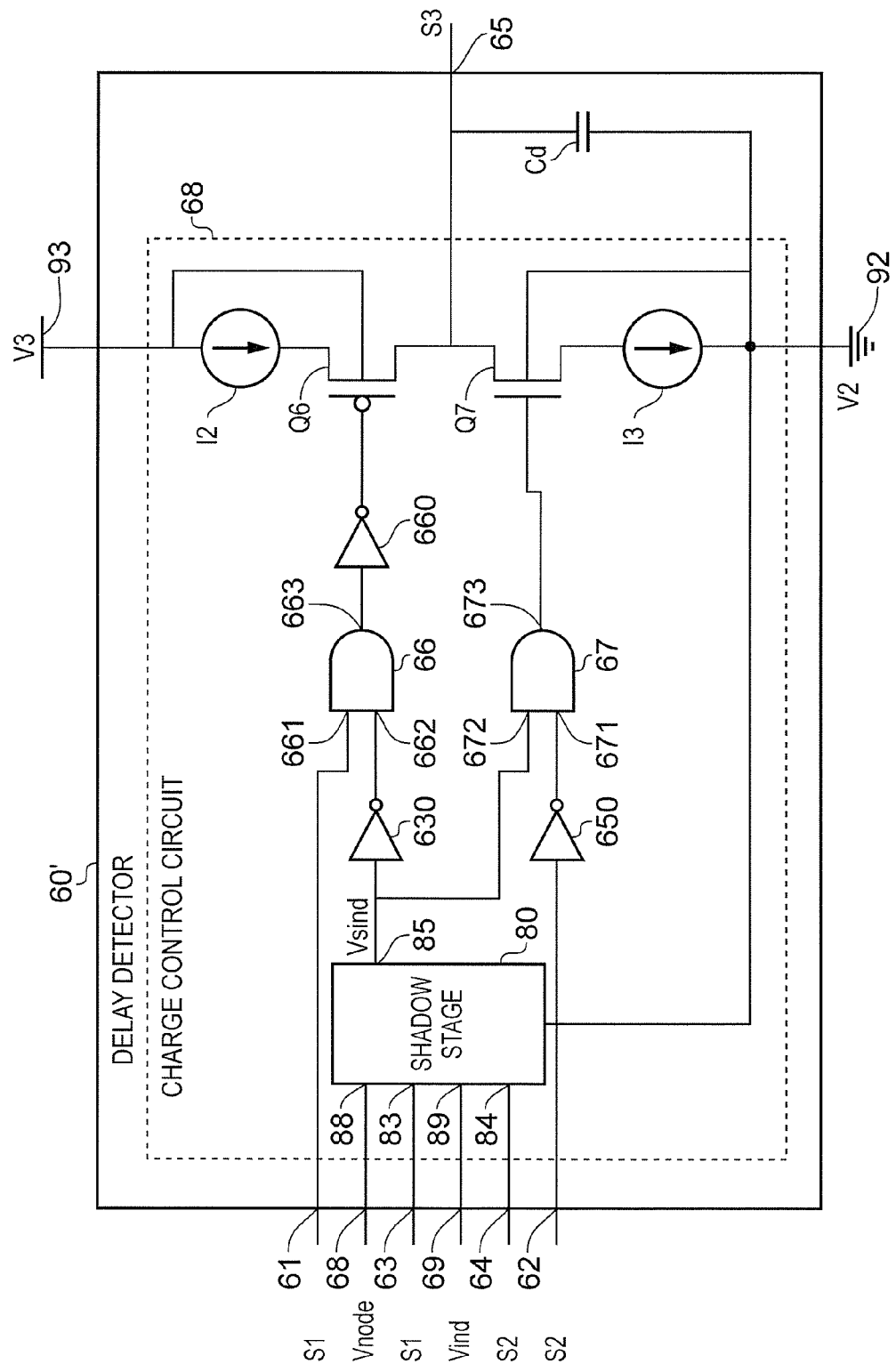
FIG. 6 is a schematic diagram of a delay detector.

Referring to FIG. 6, the delay detector 60' comprises all the elements of the delay detector 60 described with reference to FIG. 4, although there are some differences in the way the elements are coupled. There is also an additional shadow stage 80. Only the differences of the delay detector 60' with respect to the delay detector 60' are described below. The second input 662 of the first AND gate 66, instead of being coupled, by means of the first inverter 630, to the third input 63 of the delay detector 60' for receiving the first control signal S1 after it has been transmitted through the first control signal path 40, is coupled, by means of the first inverter 630, to an output 85 of the shadow stage 80 for receiving a shadow inductor node voltage Vsind. The first input 671 of the second AND gate 67, instead of being coupled directly to the second input 62 of the delay detector 60' for receiving the second control signal S2 before it has been transmitted through the second control signal path 50, is coupled to the second input 62 of the delay detector 60' by means of the third inverter 640. The second input 672 of the second AND gate 67, instead of being coupled, by means of the third inverter 640, to the fourth input 64 of the delay detector 60' for receiving the second control signal S2 after it has been transmitted through the second control signal path 50, is coupled directly, to the output 85 of the shadow stage 80 for receiving the shadow inductor node voltage Vsind.

By operation of the switching stage 20, the inductor node voltage Vind is indicative of the switching of the first and second control signals S1, S2, in particular their rising and falling edges, and therefore contains information that can be used by the delay detector 60' for generating the delay indicator signal S3, instead of employing directly the first and second control signals S1, S2 at the outputs 42, 52 of the respective first and second control signal paths 40, 50, which can employ different drive voltages as described above. The shadow stage 80 generates the shadow inductor node voltage Vsind which mimics the switching of the inductor node voltage Vind but is not affected by current flowing to and from the reactive element 10, and which switches between lower voltage levels than the first control signal S1 at the output 42 of the first control signal path 40.

Continuing to refer to FIG. 6, the shadow stage 80 has a first input 83 coupled to the third input of the delay detector 60' for receiving the first control signal S1 from the output 42 of the first control signal path 40, a second input 84 coupled to the fourth input of the delay detector 60' for receiving the second control signal S2 from the output 52 of the second control signal path 50, a third input 88 coupled to the fifth input 68 of the delay detector 60' for receiving the first node voltage Vnode, and a fourth input 89 coupled to the sixth input 69 of the delay detector 60' for receiving the inductor node voltage Vind.

Figure 7:
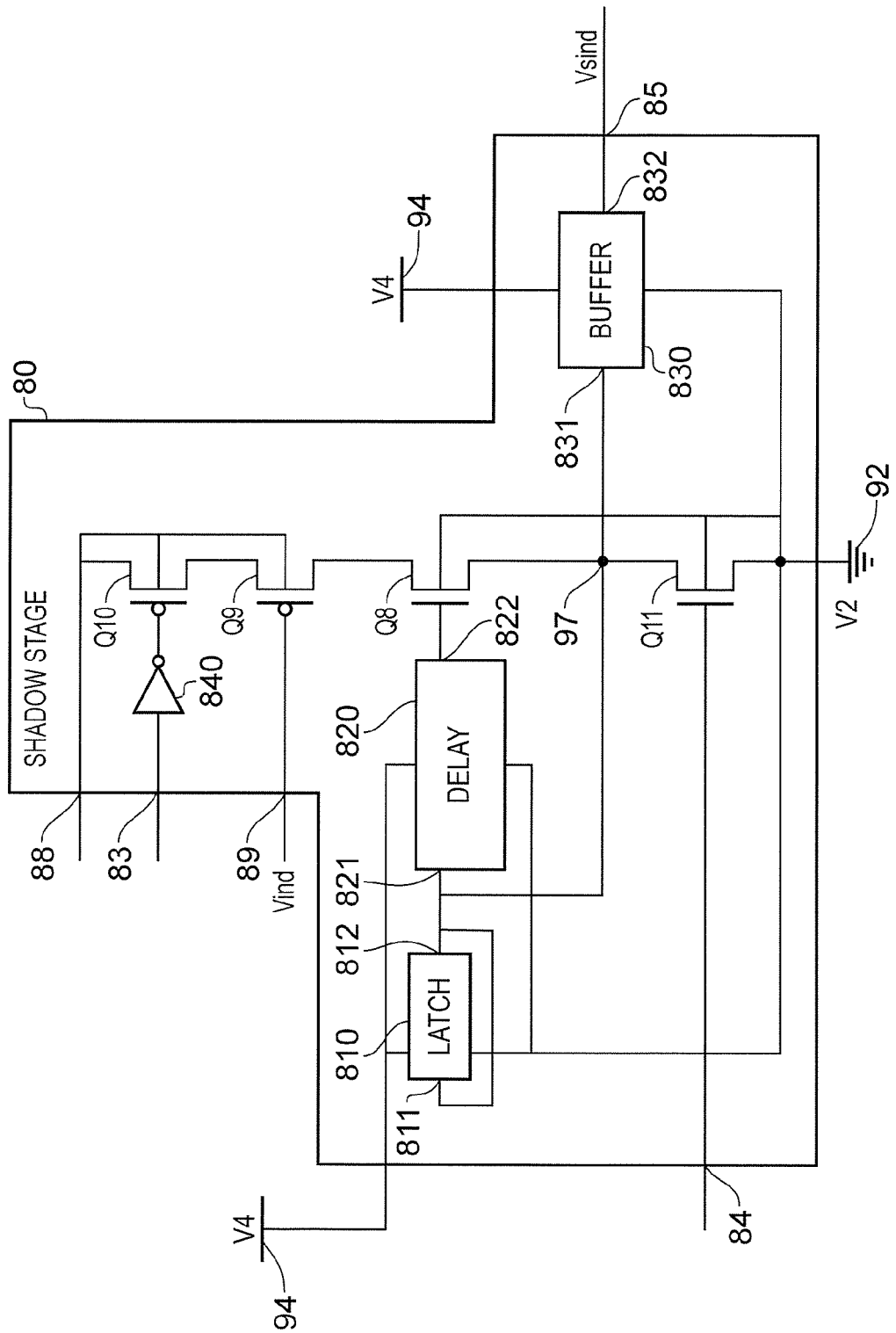
FIG. 7 is a schematic diagram of a shadow stage.

Referring to FIG. 7, the shadow stage 80 comprises an eighth transistor Q8, a ninth transistor Q9, a tenth transistor Q10 and an eleventh transistor Q11 coupled in series between the third input 88 of the shadow stage 80 and the second power supply rail 92. In more detail, the tenth transistor Q10 is a p-channel transistor and has a source and substrate coupled to the third input 88 of the shadow stage 80 for receiving the first node voltage Vnode, and a drain coupled to a source of the ninth transistor Q9. A gate of the tenth transistor Q10 is coupled to the first input 83 of the shadow stage 80 by means of a fourth inverter 840, for receiving an inverted version of the first control signal S1 at the output 42 of the first control signal path 40. The ninth transistor Q9 is also a p-channel transistor and has a substrate coupled to the third input 88 of the shadow stage 80, a gate coupled to the fourth input 89 of the delay detector 60' for receiving the inductor node voltage Vind, and a drain coupled to a drain of the eighth transistor Q8. The eighth transistor Q8 is an n-channel transistor and has a source coupled to a shadow node 97, and a substrate coupled to the second power supply rail 92. The eleventh transistor Q11 is an n-channel transistor and has a drain coupled to the shadow node 97, a source and substrate coupled to the second power supply rail 92, and a gate coupled to the second input 84 of the shadow stage 80 for receiving the second control signal S2 from the output 52 of the second control signal path 50.

The eighth and eleventh transistors Q8, Q11 mimic the switching of, respectively, the first and second transistors Q1, Q2. The first transistor Q1 is a high voltage transistor, operable with the first drive voltage of the first control signal S1 applied at its gate, and the eighth transistor Q8 is likewise a high voltage transistor operable with a same, or similar, voltage applied at its gate by the delay circuit 820. The eighth transistor Q8 may be smaller than the first transistor Q1, in particular having a smaller channel width than the first transistor Q1, and the eleventh transistor Q11 may be smaller than the second transistor Q2, in particular having a smaller channel width than the second transistor Q2. The tenth transistor Q10 is a low voltage transistor, operable with the first drive voltage of the first control signal S1 applied at its gate by the fourth inverter 840, and operable with the first node voltage Vnode applied at its drain and substrate. The ninth transistor Q9 is a high voltage transistor operable with approximately the first node voltage Vnode applied at its drain via the tenth transistor Q10, and the first node voltage Vnode applied at its substrate. The high voltage ninth transistor Q9 is present to protect the faster low voltage tenth transistor Q10 from a damagingly high over-voltage, although this aspect is implementation dependent, being dependent on the characteristics of the technology used to implement the switched mode power supply, in particular an integrated circuit process. The second and eleventh transistors Q2, Q11 need not be high voltage transistors as they are presented with relatively low voltages.

A buffer 830 has an input 831 coupled to the shadow node 97, a first power supply input coupled to the fourth power supply rail 94, a second power supply input coupled to the second power supply rail 92, and an output 832 coupled to the output 85 of the shadow stage 80 for delivering the shadow inductor node voltage Vsind. A latch 810 has an input 811 coupled to an output 812 of the latch 810. The output 812 of the latch 810 is coupled to an input 821 of a delay circuit 820, and an output 822 of the delay circuit 820 is coupled to a gate of the eighth transistor Q8. The input 821 of the delay circuit 820 is coupled to the shadow node 97. The delay circuit 820 provides inversion, such that a signal at its output 822 is a delayed and inverted version of a signal applied at its input 821. The latch 810 and the delay circuit 820 each have a first power supply input coupled to the fourth power supply rail 94 and a second power supply input coupled to the second power supply rail 92.

In operation, consider an initial state corresponding to a decoupling time period, in which the first and second control signals S1, S2 at the respective outputs 42, 52 of the first and second control signal paths 40, 50 have a relatively low voltage, and therefore the first and second transistor Q1,Q2 are in a non-conducting state, the inductor node voltage Vind is floating at a relatively low voltage. Correspondingly the tenth and eleventh transistors Q10, Q11 are in a non-conducting state and the shadow node 97 is floating at a relatively low voltage, and the shadow inductor node voltage Vsind is relatively low. The ninth transistor Q9 is in a conducting state, due to the low voltage of the inductor node voltage Vind applied at its gate. The eighth transistor Q8 is in a conducting state, due to a relatively high voltage applied at its gate by the delay circuit 820, which inverts the low voltage at the shadow node 97.

When the first control signal S1 at the output 42 of the first control signal path 40 switches to the relatively high first drive voltage, at the rising edge of the first pulse P1, the first transistor Q1 is switched to a conducting state, thereby raising the inductor node voltage Vind, and the tenth transistor Q10 is also switched to a conducting state, thereby raising the voltage at the shadow node 97 and the shadow inductor node voltage Vsind. The rise of the inductor node voltage Vind causes the ninth transistor Q9 to switch to a non-conducting state, and the rise of the voltage at the shadow node 97 causes the eighth transistor Q8 to switch to a non-conducting state. The shadow node 97 remains at a high voltage because its high voltage is latched by the latch 810.

When the first control signal S1 at the output 42 of the first control signal path 40 switches to a relatively low voltage, at the falling edge of the first pulse P1, the first transistor Q1 is switched to a non-conducting state, and consequently the inductor node voltage Vind floats at the established high value, due to the charge in the reactive element 10. The tenth transistor Q10 is also switched to a non-conducting state, but the voltage at the shadow node 97 is unchanged at its high level, as the ninth transistor Q9 remains in the non-conducting state.

When the second control signal at the output 52 of the second control signal path 50 switches to a relatively high voltage, at the rising edge of the second pulse P2, the second transistor Q2 is switched to a conducting state, thereby discharging the reactive element 10 and reducing the inductor node voltage Vind to a low value, and the eleventh transistor Q11 is switched to a conducting state, thereby reducing the voltage at the shadow node 97, and the shadow inductor node voltage Vsind, to a low value.

When the second control signal at the output 52 of the second control signal path 50 switches to a relatively low voltage, at the falling edge of the second pulse P2, the second transistor Q2 is switched to a non-conducting state, and the inductor node voltage Vind floats at the established low value. The eleventh transistor Q11 is also switched to a non-conducting state, but the voltage at the shadow node 97, and the shadow node voltage Vsind, is unchanged at the low level, as the low level is latched by the latch 810.

The transitions in the shadow node voltage Vsind, therefore, mimic the transitions in the inductor node voltage Vind, as described above. The delay detector 60' uses the transitions in the shadow node voltage Vsind for delay detection, thereby overcoming, at least partially, the disadvantages described above in relation to the delay detector 60 of FIG. 4. Therefore, in the embodiment described with reference to FIGS. 5, 6 and 7, the charge control circuit 68 is arranged to generate a shadow signal at the shadow node 97 by switching the third n-channel transistor Q8 responsive to the first control signal S1 at the first input 21 of the switching stage 20 and switching the fourth n-channel transistor Q11 responsive to the second control signal S2 at the second input 22 of the switching stage 20. In this embodiment, the first AND gate 66 is a first comparison circuit arranged to determine the duration of the second charging time periods dependent on a time difference between the first control signal S1 at the first output 31 of the control signal generator 30 and the shadow signal, and the second AND gate 67 is a second comparison circuit arranged to determine the duration of the second discharging time periods dependent on a time difference between the second control signal at the second output 32 of the control signal generator 30 and the shadow signal.

Figure 8:
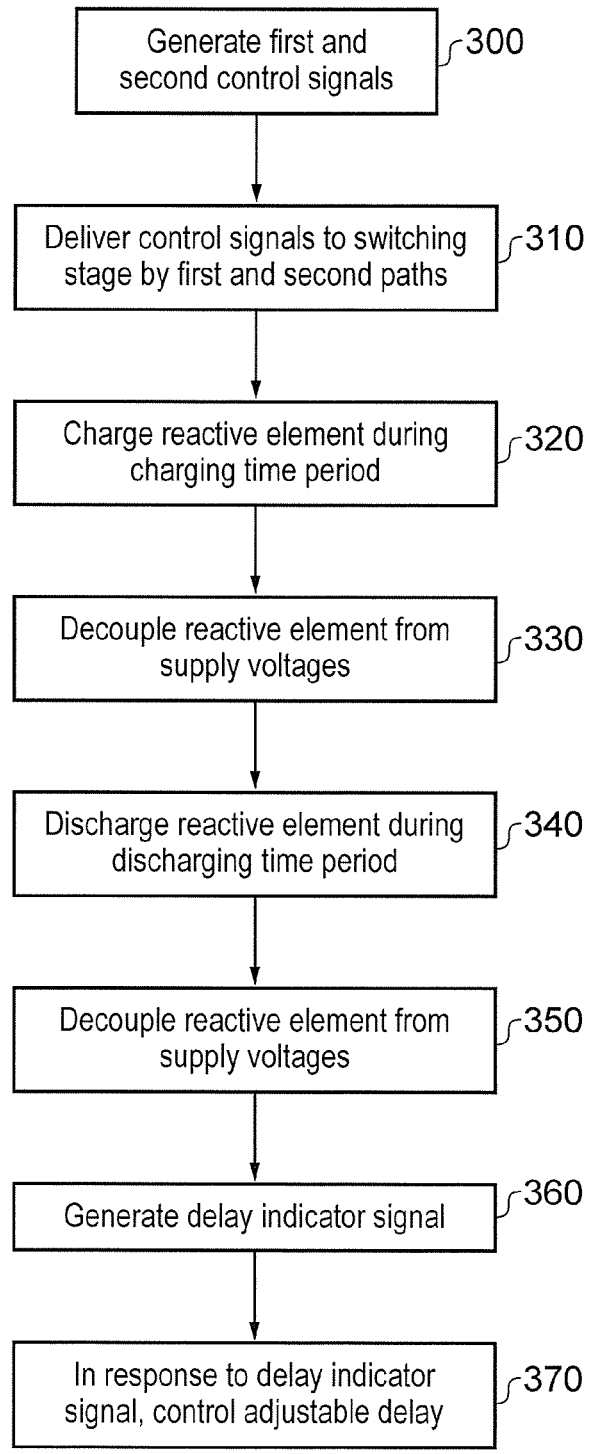
FIG. 8 is flow chart of a method of operating a switched mode power supply.

Referring to FIG. 8, a method of operating the switched mode power supply 100 comprises, at step 300, the control signal generator 30 generating the first control signal S1 and the second control signal S2. At step 310, the first control signal S1 is delivered to the switching stage 20 by means of the first control signal path 40 and the second control signal S2 is delivered to the switching stage 20 by means of the second control signal path 50. At steps 320, 330 and 330 the switching stage 20 employs the first and second switching signals S1, S2. At step 320, during one of the first charging time periods, in response to the first control signal S1, the switching stage 20 couples the reactive element 10 to the first power supply voltage V1, whilst in response to the second control signal S2 the reactive element 10 is decoupled from the second power supply voltage V2. At step 330, during a decoupling time period, the switching stage 20 decouples the reactive element 10 from the first power supply voltage V1 whilst the reactive element 10 remains decoupled from the second power supply voltage V2. At step 340, during the next occurring one of the first discharging time periods, in response to the second control signal S2, the switching stage 20 couples the reactive element 10 to the second power supply voltage V2, whilst in response to the first control signal S1 the reactive element remains decoupled from the first power supply voltage. At step 350, during the next occurring decoupling time period, the switching stage 20 decouples the reactive element 10 from the second power supply voltage V2 whilst the reactive element 10 remains decoupled from the first supply voltage V1. The first charging time periods and the first discharging time periods alternate, and successive ones of the first charging time periods and first discharging time periods are spaced apart by one of the decoupling time periods. At step 360, the delay detector 60 generates the delay indicator signal S3 indicative of a relative delay between the first control signal S1 and the second control signal S2 at the switching stage 20. At step 370, in response to the delay indicator signal S3, the adjustable delay stage 53 controls the adjustable delay in one of the first and second signal paths 40, 50 so that a first delay experienced by the first control signal S1 in the first control signal path 40 is substantially equal to a second delay experienced by the second control signal S2 in the second control signal path 50. The steps 300 to 370 may be repeated in a loop.

Figure 9:
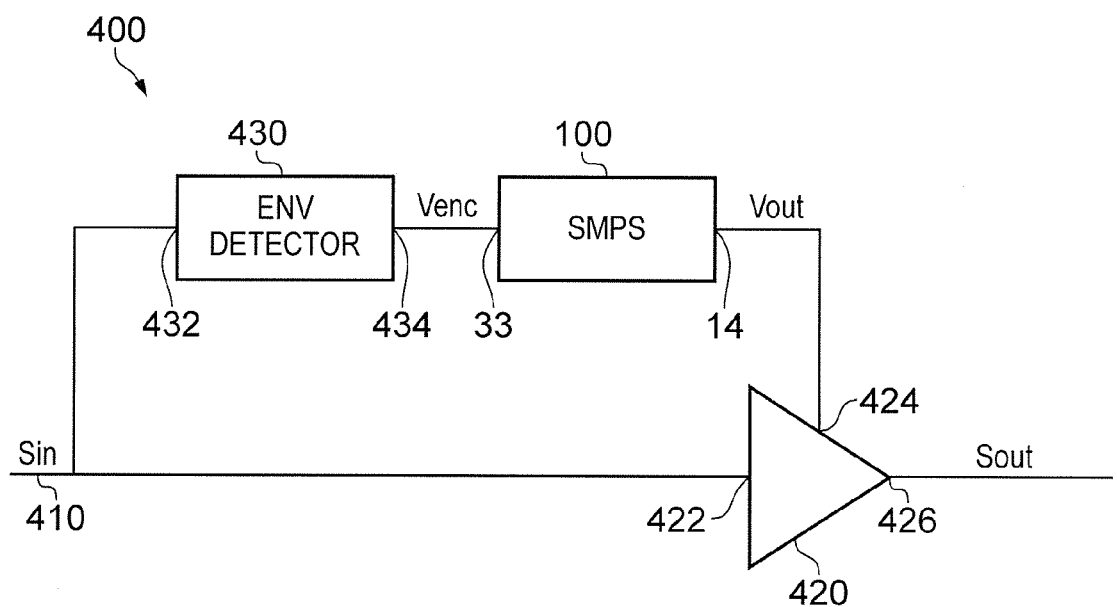
FIG. 9 is a schematic diagram of an envelope tracking amplifier.

Referring to FIG. 9, an envelope tracking amplifier 400 comprises an input 410 for a signal to be amplified Sin. The input 410 of the envelope tracking amplifier 400 is coupled to an input 422 of a power amplifier 420 for amplifying the signal to be amplified Sin, and is also coupled to an input 432 of an enveloped detector 430. The envelope detector 430 generates, at an output 434 of the envelope detector 430, an envelope signal Venv that is indicative of an envelope of the signal to be amplified Sin. The output 434 of the envelope detector 430 is coupled to the input 33 of the switched mode power supply 100 for delivering the envelope signal Venv as the input signal of the switched mode power supply 100. The output 14 of the switched mode power supply 100 is coupled to a power supply input 424 of the power amplifier 420 for delivering the output signal Vout of the switched mode power supply 100 as a power supply voltage of the power amplifier 420 which varies dependent on the envelope of the signal to be amplified Sin. An output 426 of the power amplifier 420 delivers an output signal Sout that is an amplified version of signal to be amplified Sin.

Figure 10:
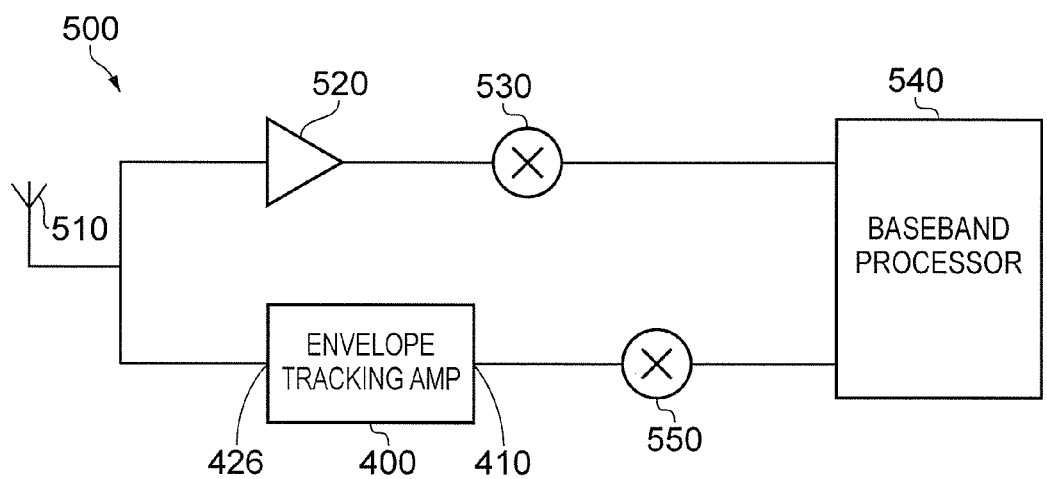
FIG. 10 is a schematic diagram of a wireless communication device.

Referring to FIG. 10, a wireless communication device 500 comprises an antenna 510 coupled to a low noise amplifier 520 for amplifying radio frequency (RF) signals received at the antenna 510. An output of the low noise amplifier 520 is coupled to an input of a down-converter 530 for mixing the received RF signals to baseband. An output of the down-converter 530 is coupled to a baseband processor 540 for demodulating baseband signals received from the down-converter 530, and decoding demodulated signals. Signals for transmission are encoded and modulated onto a carrier signal by the baseband processor 540, and an output of the baseband processor 540 is coupled to an input of an up-converter 550 for mixing the modulated carrier signal to RF. An output of the up-converter 550 is coupled to the input 410 of the envelope tracking amplifier 400 for amplifying the modulated carrier signal at RF, although other types of amplifier may alternatively be used, and in particular an amplifier employing the switched mode power supply 100. The output 426 of the envelope tracking stage 400 is coupled to the antenna 510 for transmission of the amplified signal.

Although the switched mode power supply is described with reference to an envelope tracking amplifier, the switched mode power supply may also be used in other applications, such as other types of amplifier, requiring a power supply, being of particular advantage where fast variation of a power supply voltage is required.

Although the disclosure is described with reference to LTE and digital interface standards specified by the MIPI Alliance, the disclosure is not limited to these standards but has application to other digital interfaces, for example in other frequency bands, such as around 30 Hz. Similarly, although the disclosure is described with reference to a wireless communication device, the disclosure is not limited to such a device, but has application to other electronic devices incorporating a digital interface.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that

The invention claimed is:

1. A switched mode power supply comprising:
   a reactive element comprising a first terminal, for charging and discharging the reactive element, and a second terminal, for an output voltage;
   a switching stage having a first input and a second input; and
   a control signal generator arranged to generate a first control signal at a first output of the control signal generator and a second control signal at a second output of the control signal generator, wherein the first output of the control signal generator is coupled to the first input of the switching stage by means of a first control signal path and the second output of the control signal generator is coupled to the second input of the switching stage by means of a second control signal path;
   wherein the switching stage is arranged to
   (a) during first charging time periods, responsive to the first control signal, couple the reactive element to a first supply voltage for charging the reactive element, and responsive to the second control signal, decouple the reactive element from a second supply voltage lower than the first supply voltage,
   (b) during first discharging time periods, responsive to the first control signal, decouple the reactive element from the first supply voltage, and responsive to the second control signal, couple the reactive element to the second supply voltage for discharging the reactive element, and
   (c) during decoupling time periods, responsive to the first control signal, decouple the reactive element from the first supply voltage, and responsive to the second control signal, decouple the reactive element from the second supply voltage,
     wherein the first charging time periods and the first discharging time periods alternate and are each spaced apart by one of the decoupling time periods;
   a first capacitive element having a first terminal coupled to the first terminal of the reactive element and a second terminal coupled to a first node, wherein the first control signal path is coupled to the first node and is arranged to determine the first drive voltage dependent on a difference between a first node voltage at the first node and a voltage at the first terminal of the reactive element;
   a first charging diode coupled between the first node and a third power supply rail at a third supply voltage higher than the second supply voltage, and arranged for charging the first capacitive element from the third supply voltage;
   a voltage regulator coupled to the first node and to a fourth power supply rail at a fourth supply voltage higher than the third supply voltage, wherein the voltage regulator is arranged to control the first node voltage dependent on the fourth supply voltage;
   a delay detector arranged to generate a delay indicator signal indicative of a relative delay between the first control signal at the first input of the switching stage and the second control signal at the second input of the switching stage; and
   an adjustable delay stage in one of the first and second control signal paths and arranged to, responsive to the delay indicator signal, control an adjustable delay so that a first delay experienced by the first control signal passing from the first output of the control signal generator to the first input of the switching stage is substantially equal to a second delay experienced by the second control signal passing from the second output of the control signal generator to the second input of the switching stage.

2. The switched mode power supply of claim 1, wherein the reactive element comprises an inductive element coupled between the first and second terminals, and an output capacitive element coupled to the second terminal.

3. The switched mode power supply of claim 1, the switching stage comprising:
   a first n-channel transistor coupled between a first terminal of the reactive element and a first power supply rail at the first supply voltage and having a first gate coupled to the first input of the switching stage, and
   a second n-channel transistor coupled between the first terminal of the reactive element and a second power supply rail at the second supply voltage and having a second gate coupled to the second input of the switching stage;
   wherein the first n-channel transistor is arranged, responsive to the first control signal, to couple the first terminal of the reactive element to a first power supply rail at the first supply voltage during the first charging time periods and to decouple the first terminal of the reactive element from the first power supply rail during the first discharging time periods and the decoupling time periods;
   wherein the second n-channel transistor is arranged, responsive to the second control signal, to decouple the first terminal of the reactive element from a second power supply rail at the second supply voltage during the first charging time periods and the decoupling time periods and to couple the first terminal of the reactive element to the second power supply rail during the first discharging time periods, and
   wherein the first control signal path is arranged to deliver the first control signal to the first input of the switching stage at, during the first charging time periods, a first drive voltage higher than the first supply voltage.

4. The switched mode power supply of claim 1, wherein the first control signal path comprises a first power supply input coupled to the first node and a second power supply input coupled to the first terminal of the reactive element, and wherein the first control signal path is arranged to determine the first drive voltage dependent on the first node voltage and the voltage at the first terminal of the reactive element.

5. The switched mode power supply of claim 1, comprising:
   a second capacitive element having a first terminal coupled to the first terminal of the reactive element and a second terminal coupled to a second node; and
   a second charging diode coupled between the second node and the fourth power supply rail and arranged for charging the second capacitive element from the fourth supply voltage;
   wherein the voltage regulator comprises a first regulator terminal coupled to the second node, a second regulator output coupled to the first node, and a third regulator terminal coupled to the first terminal of the reactive element, and wherein the voltage regulator is arranged to control the first node voltage dependent on a difference between a second node voltage at the second node and the voltage at the first terminal of the reactive element.

6. The switched mode power supply of claim 1, wherein the delay detector comprises a delay detection capacitive element coupled to a charge control circuit, wherein the charge control circuit is arranged to alternately charge the delay detection capacitive element during second charging time periods of duration dependent on the first delay and discharge the delay detection capacitive element during second discharging time periods of duration dependent on the second delay, and wherein the delay indication signal is dependent on a voltage across the delay detection capacitive element.

7. The switched mode power supply of claim 6, wherein the charge control circuit comprises:
- a first comparison circuit arranged to determine the duration of the second charging time periods dependent on a time difference between the first control signal at the first output of the control signal generator and the first control signal at the first input of the switching stage; and
- a second comparison circuit arranged to determine the duration of the second discharging time periods dependent on a time difference between the second control signal at the second output of the control signal generator and the second control signal at the second input of the switching stage.

8. The switched mode power supply of claim 7, wherein the first comparison circuit is a logical AND gate and the second comparison circuit is a logical AND gate.

9. The switched mode power supply of claim 6, wherein the charge control circuit comprises:
- a third n-channel transistor coupled to a third node;
- a fourth n-channel transistor coupled to a third node;
- wherein the charge control circuit is arranged to generate a shadow signal at the third node by switching the third n-channel transistor responsive to the first control signal at the first input of the switching stage and switching the fourth n-channel transistor responsive to the second control signal at the second input of the switching stage;
- a first comparison circuit arranged to determine the duration of the second charging time periods dependent on a time difference between the first control signal at the first output of the control signal generator and the shadow signal; and
- a second comparison circuit arranged to determine the duration of the second discharging time periods dependent on a time difference between the second control signal at the second output of the control signal generator and the shadow signal.

10. An amplifier circuit comprising:
the switched mode power supply of claim 1;
and an amplifier coupled to and powered by the switched mode power supply.

11. A wireless communication device comprising the amplifier circuit of claim 10 and further comprising a baseband processor operatively coupled to the amplifier circuit.

* * * * *

UNITED STATES PATENT AND TRADEMARK OFFICE
CERTIFICATE OF CORRECTION

PATENT NO. : 9,819,267 B2
APPLICATION NO. : 14/916155
DATED : November 14, 2017
INVENTOR(S) : Kimmo Koli et al.

It is certified that error appears in the above-identified patent and that said Letters Patent is hereby corrected as shown below:

In the Claims

Column 21, Line 45, 'the' should be changed to 'a'.

Column 22, Line 40, 'a' should be changed to 'the'.

Signed and Sealed this
Seventeenth Day of April, 2018

Andrei Iancu
*Director of the United States Patent and Trademark Office*